Feb. 23, 1960 L. J. KAMMEYER 2,925,917
AUTOMOBILE RADIATOR MOUNTED TOOL TRAY
Filed Aug. 8, 1958

INVENTOR.
LYLE J. KAMMEYER
BY
McMorrow, Berman & Davidson
ATTORNEYS

United States Patent Office 2,925,917
Patented Feb. 23, 1960

2,925,917

AUTOMOBILE RADIATOR MOUNTED TOOL TRAY

Lyle J. Kammeyer, Tripoli, Iowa

Application August 8, 1958, Serial No. 753,919

2 Claims. (Cl. 211—86)

This invention relates generally to improvements in tool trays for temporary mounting under the hoods of automobiles while working on motors; and more particularly to an improved device of this kind which is designed for mounting on radiator filter pipes upon removal of the usual radiator caps thereon and has means for illuminating the tray and the motors.

The primary object of the invention is to provide a simple, practical, efficient, and easily mounted and removed device of the character indicated above, which leaves a motor compartment behind the radiator of an automobile and the motor therein free and unencumbered, so that a mechanic can work upon a motor without interference from the tray while having his tools immediately accessible from the tray; and with the motor and the tray illuminated to facilitate the work.

Another object of the invention is to provide a device of the character indicated above wherein the tray has a mounting member in the form of a radiator filling pipe engaging cap, and the illuminating means is in the form of an adjustable gooseneck electric lamp to which leads an electric cord which is contained on a spring-actuated reel enclosed protectively within the tray, and which is adapted to be drawn out to the extent necessary for connection of the cord to an available electrical outlet.

Other important objects and advantageous features of the invention will be apparent from the following description and the accompanying drawings, wherein, for purposes of illustration only, a specific form of the invention is set forth in detail.

Figure 1:
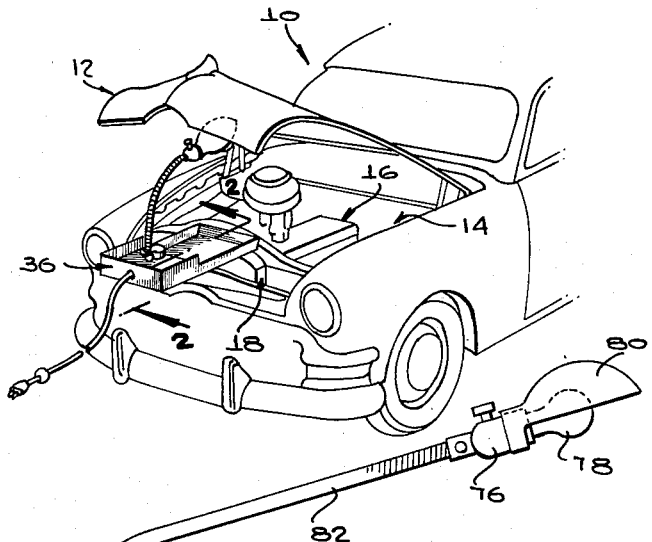
Figure 1 is a perspective view showing the motor compartment of an automobile with the hood thereof raised and exposing the motor and the radiator, and showing a device of the invention mounted on the radiator.

Referring in detail to the drawings, wherein like numerals designate like parts throughout the several views, the numeral 10 generally designates an automobile having a hood 12 over a motor compartment 14 containing a motor 16, with a radiator 18 in front of the motor. As is conventional, the radiator 18 has on its upper end 20 an upstanding filler pipe 22 having around its open upper end a lateral tubular annular flange 24 having an upper side 26, a lower side 28, and an outer side 30. As also usual, the filler pipe flange 24 has circumferentially spaced openings 32 therethrough, through which similarly spaced lugs on an ordinary radiator cap (not shown) are passed downwardly before the cap is rotated to engage such lugs with the lower side 28 of the filler pipe flange 24 to secure the cap in closing relation to the filler pipe. This filler pipe flange structure is utilized, in the present invention, as hereinafter described.

Figure 2:
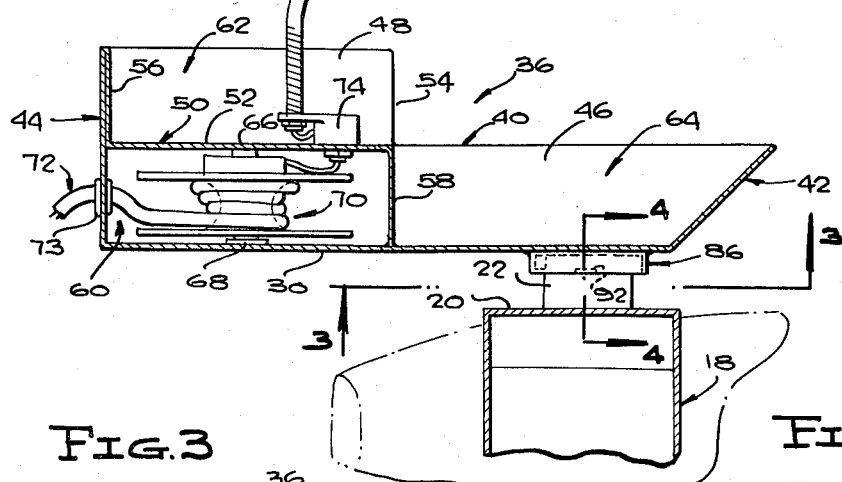
Figure 2 is an enlarged vertical longitudinal section taken on the line 2—2 of Figure 1.
Figure 3:
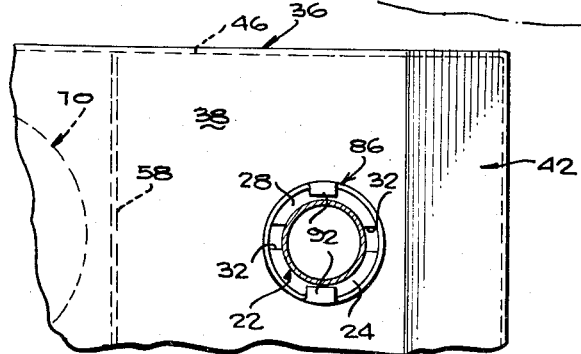
Figure 3 is a fragmentary bottom plan view taken from the line 3—3 of Figure 2.

The illustrated tool tray, generally designated 36, is formed of metal or other suitable sized sheet material, and is preferably of a longitudinally elongated rectangular form, and comprises a flat bottom wall 38, longitudinal side walls 40, a relatively low rear end wall 42, and a relatively high or tall front end wall 44. As shown in Figure 2, the rear end wall 42 is slanted downwardly and forwardly to join the bottom wall 38, and thereby reduces interference with work being performed beneath the rear end of the tray.

The side walls 40 include relatively low rear portions 46 of the same height as and joined to the ends of the low rear end wall 42 of the tray, and relatively high forward portions 48 which extend to and are of the same height as, and are joined to the ends of the high front end tray wall 44.

A reclining Z-shaped partition wall 50 located within the forward part of and extending across the tray 36, comprises a horizontal portion 52 which is spaced above and is parallel to the bottom wall 38, preferably on the level of the upper edges of the low side wall portions 46, and extends longitudinally and forwardly from the rear edges 54 of the high side wall portions 48 to the high front end wall 44, to which the partition wall portion 52 is secured by an upstanding flange 56. As shown in Figure 2, the flange 56 can be integral at its upper edge with the upper edge of the tall front end wall 44. The partition wall 50 further comprises a depending flange 58 on its rear edge which extends between the tray side walls 40 and reaches to and is suitably secured to the tray bottom wall 38.

The partition wall 50 described above defines below its horizontal portion 52 an electric lamp cord reel compartment 60, and above the horizontal portion 52 is a forward tool compartment 62 which is open at its rear end. The depending flange 58 defines with the lower side wall portions 46 and the rear end wall 42 a rear tool compartment 64 in the tray 36.

Suitably mounted in the reel compartment 60, as indicated at 66 and 68, is a vertical axis flanged reel 70, of suitable spring-actuated type, having wound thereon a flexible insulated electrical cord 72, which has an end which runs through a grommet-equipped opening 73 in the tray rear end wall, for connection to an available electrical outlet (not shown). The other end of the cord 72 is extended through a lamp bracket 74 secured through the horizontal portion 52 of the partition wall 50, preferably in a rearward position near the depending flange 58, and is suitably electrically connected to a switch-equipped electric lamp socket 76, which carries a bulb 78 and an adjustable shade 80, mounted on the rear end of a flexible gooseneck 82 whose other end is mounted on the bracket 74. As shown in Figure 2, the bulb 78 can be located above and behind the rear end of the tray 36, so as to illuminate the interior of the motor compartment 14 and the motor 16 therein, and at the same time provide illumination for convenient selection of tools in the tool compartments 62 and 64 of the tray 36. The gooseneck 82, can, of course, be adjusted to give the bulb different desired positions.

Figure 4:
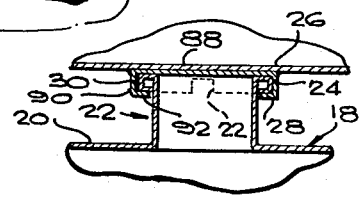
Figure 4 is a further enlarged fragmentary vertical transverse section taken on the line 4—4 of Figure 2.

For mounting the tray 36 removably on the filler pipe 22 of the radiator 18, there is suitably fixed on the underside of the tray bottom wall 38, at a central location close to the rear end wall 42, mounting means here shown as in the form of a socket 86 having substantially the structural components of an ordinary radiator cap. The socket 86 comprises a flat top wall 88 secured to the underside of the tray bottom wall 38, a depending circular annular flange 90 on the peripheral edge of the top wall 88, and radially inwardly projecting lugs 92 on the lower edge of the flange 90, for passage through the openings 32 in the flange 24 of the filler pipe 22, and securable engagement with the lower side 28 of the flange 24, so as to abut the socket top wall 88 with the upper side 26 of the flange 24, with the annular socket flange 90 closely surrounding the outer side 30 of the filler pipe flange 24, as shown in Figure 4.

With tray 36 mounted as above described, the major part of the length of the tray 36 extends forwardly beyond the radiator 18, so as to be out of the motor compartment 14 and out of the way of a mechanic working in the motor compartment. A certain amount of angular adjustment of the tray 36 to either side of the normal longitudinal position of the tray, such as shown in Figure 1, is feasible, when desired, to facilitate the mechanic's work and convenience, since there is sufficient leeway for rotating the mounting socket 86 on the filler pipe 22 without bringing the lugs 92 into registry with the openings 32 in the filler pipe flange 24.

Although that has been shown and described herein a preferred form of the invention, it is to be understood that the invention is not necessarily confined thereto, and that any change or changes in the structure of and in the relative arrangement of components thereof are contemplated as being within the scope of the invention as defined by the claims appended hereto.

What is claimed is:

1. An automobile radiator mountable tool tray comprising a bottom wall, longitudinal side walls, a low rear end wall joined to the bottom wall and the side walls, a tall front end wall joined to the bottom wall and said side walls, a partition wall extending across the tray near said tall end wall and extending between the side walls and to the tall end wall, said partition wall having a horizontal portion spaced upwardly from the bottom wall, a depending flange joined to the bottom wall at the end of the horizontal portion remote from the tall end wall, said horizontal portion, said tall end wall and said depending flange defining a forward tool compartment above the horizontal portion, a reel compartment beneath said horizontal portion, and a rear tool compartment wtihin the tray behind said depending flange, and radiator mounting means on the underside of the bottom wall.

2. An automobile radiator mountable tool tray comprising a bottom wall, longitudinal side walls, a low rear end wall joined to the bottom wall and the side walls, a tall front end wall joined to the bottom wall and said side walls, a partition wall extending across the tray near said tall end wall and extending between the side walls and to the tall end wall, said partition wall having a horizontal portion spaced upwardly from the bottom wall, a depending flange joined to the bottom wall at the end of the horizontal portion remote from the tall end wall, said horizontal portion, said tall end wall and said depending flange defining a forward tool compartment above the horizontal portion, a reel compartment beneath said horizontal portion, and a rear tool compartment within the tray behind said depending flange, and radiator mounting means on the underside of the bottom wall, a spring-actuated lamp cord reel mounted in said reel compartment, an adjustable lamp structure mounted in said forward tool compartment to which said cord is electrically connected.

References Cited in the file of this patent

UNITED STATES PATENTS

| | | |
|---|---|---|
| 1,815,651 | Fieldstein | July 21, 1931 |
| 1,848,214 | Brown | Mar. 8, 1932 |
| 1,919,189 | Andrie | July 25, 1933 |
| 2,164,478 | Smith | July 4, 1939 |
| 2,603,431 | Cramer | July 15, 1952 |
| 2,790,547 | Sutton | Apr. 30, 1957 |
| 2,805,778 | Yordi | Sept. 10, 1957 |
| 2,827,556 | Kersey | Mar. 18, 1958 |
| 2,843,287 | Finley | July 15, 1958 |